March 5, 1929.  B. KITCHIN  1,704,390
METHOD FOR PREVENTING BOILER INCRUSTATION
Filed Nov. 15, 1927
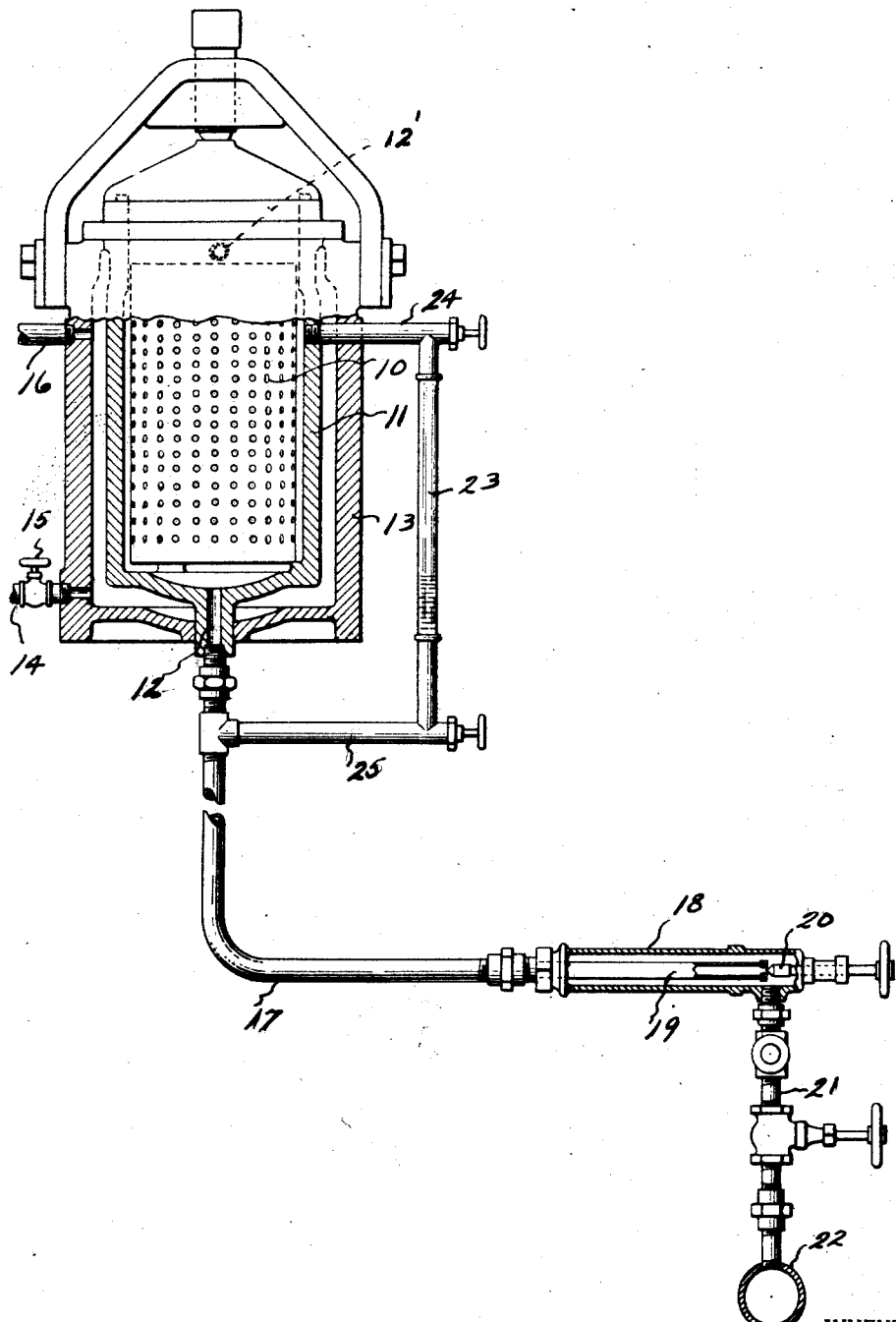
INVENTOR.
Boris Kitchin
BY Gifford & Scull
ATTORNEYS.

Patented Mar. 5, 1929.

1,704,390

UNITED STATES PATENT OFFICE.

BORIS KITCHIN, OF FOREST HILLS, NEW YORK, ASSIGNOR TO FILTRATORS COMPANY, INCORPORATED, OF NEW YORK, N. Y., A CORPORATION OF NEW YORK.

METHOD FOR PREVENTING BOILER INCRUSTATION.

Application filed November 15, 1927. Serial No. 233,409.

My invention relates to improvements in methods for preventing boiler incrustation, and will be best understood from the annexed drawing and the following description of a preferred embodiment of apparatus by which my novel method may be conveniently carried out.

In certain forms of apparatus for preventing boiler incrustation, flaxseed or the like is subjected to wet steam under pressure so that an emulsion of the condensate and the mucilaginous substance of the seed may be obtained, which emulsion is delivered to the boiler water.

In certain forms of such apparatus, the emulsion is permitted to flow out into suitable receptacles or into the feed line of the boiler or boilers being treated, and consequently there must be some form of trap or an equivalent by which the emulsion will be permitted to flow out while the pressure is maintained on the seed. If the trap is set so that the emulsion is delivered to the boiler water or to a receptacle as fast as it is formed, there is a liability for the watery portion of the emulsion to evaporate and thus leave a deposit of the muscilaginous material on the walls of the pipes, and particularly in the trap itself, so that the apparatus may become clogged.

It is the object of my invention to prevent this.

In the illustrative arrangement, a perforated receptacle 10 is enclosed in a cylinder 11 to which steam is supplied through a pipe 12′, the resulting emulsion flowing from the bottom of the cylinder 11 through the opening 12.

In the working of such apparatus, it is essential that the exterior of the cylinder 11 be cooled and, while this cooling may be done either by direct radiation to the air through fins or the like on the cylinder 11, I prefer to cool it by circulating water through a water jacket space formed by the jacket 13 surrounding cylinder 11. Cooling water is supplied to the water jacket space through the pipe 16 provided with valve 15. The cooling effect of this water in the water jacket space condenses the steam in the cylinder 11 to form the watery part of the emulsion delivered through the opening 12.

The emulsion, in the form illustrated, is delivered through the pipe 17 to a trap 18, this trap being a well-known form in which a longitudinally expansible tube 19 has its end opening closed by a valve 20 by which the amount of opening of the trap in normal operation can be controlled. From the trap 18, the emulsion flows through the valved pipe 21 to the feed water line 22. The trap 18 operates in a normal manner; that is, so long as liquid is passed through the tube 19, the relation between the end of the tube 19 and the valve 20 will remain at the distance determined by the setting of the valve 20. If, however, the liquid passes from the pipe 17 faster than it is supplied to that pipe, then steam will ultimately reach the tube 19 and cause its expansion to bring the valve seat on the end of the tube 19 against the valve 20 to close the same.

I have found that the apparatus described may be operated so that, if the pipe 17 and a part of the cylinder 11 are maintained filled with emulsion, then the drying out and the clogging of the pipes and apparatus referred to above will be prevented.

This may be accomplished in either one of two ways, according to the manner in which it is desired to operate the apparatus.

In order to operate the apparatus in either of these two ways, however, it is desirable that the operator be able to determine the level at which the emulsion stands in the apparatus, and to enable this to be done, I provide a gauge glass 23 connected by pipe 24 to the interior of cylinder 11 and by pipe 25 to the pipe 17.

Preferably, the emulsion level is maintained at a point approximately at or just below the bottom of the container 10. This level may be maintained by first closing the valve 20, when the apparatus is put into operation, until the emulsion reaches the desired level, and then opening the valve 20 only to such an extent that the flow past the trap 18 will be at the same rate that the emulsion is formed in the cylinder 11.

Alternatively and preferably, I control the emulsion level by the supply of cooling water through the pipe 14, in which case, the valve 20 may be set to any desired opening and then the amount of emulsion which will be formed, will be controlled by supplying more or less cooling water to the water jacket space. This, in turn, will control the rate of condensation of the steam in the cylinder 11, and consequently the operator will be able to maintain the emulsion level at the desired point, irrespective of the amount of opening of the valve 20 within reasonable limits.

It will be understood that other forms of control cooling of the cylinder 11 may be used instead of the water cooling, such, for instance, as providing fins on the jacket 11 and varying the rate of flow of air or the like over these fins.

It will also be understood that the particular form of trap shown in the drawing is merely illustrative and that any other form of arrangement may be used by which the emulsion may be permitted to flow from the cylinder 11 under control. For instance, the trap may be dispensed with entirely and the emulsion permitted to flow directly into the boiler to be treated.

It will also be understood that the particular form of emulsion extractor shown in the drawing is merely illustrative and that my invention may be applied to any other form of extractor.

I claim:

1. The method of operating an extractor of mucilaginous substances from vegetable matter, which includes admitting wet steam to a closed receptacle containing the vegetable matter, cooling the receptacle to condense steam therein, permitting the condensate to flow from the receptacle through the lower part thereof, and controlling the relation between the rate of flow of the condensate from the receptacle and the rate of formation of the condensate in the receptacle to maintain the level of the condensate substantially at the bottom of the receptacle.

2. The method of operating an extractor of mucilaginous substances from vegetable matter, which includes admitting wet steam to a closed receptacle containing the vegetable matter, cooling the receptacle by causing cooling water to flow over its exterior, to condense steam in the receptacle, permitting the condensate to flow from the receptacle through the lower part thereof at a regulated rate and regulating the flow of cooling water over the receptacle and thereby the rate of formation of condensate in the receptacle, to maintain the level of the condensate substantially at the bottom of the receptacle.

BORIS KITCHIN.